US010769101B2

(12) United States Patent
Goenka et al.

(10) Patent No.: US 10,769,101 B2
(45) Date of Patent: Sep. 8, 2020

(54) SELECTIVE DATA MIGRATION AND SHARING

(71) Applicant: OATH INC., New York, NY (US)

(72) Inventors: Mohit Goenka, Santa Clara, CA (US); Ashish Khushal Dharamshi, Sunnyvale, CA (US); Nikita Varma, Milpitas, CA (US)

(73) Assignee: OATH INC., New York, NY (US)

( * ) Notice: Subject to any disclaimer, the term of this patent is extended or adjusted under 35 U.S.C. 154(b) by 195 days.

(21) Appl. No.: 16/110,234

(22) Filed: Aug. 23, 2018

(65) Prior Publication Data
US 2020/0065397 A1 Feb. 27, 2020

(51) Int. Cl.
| | | |
|---|---|---|
| *G06F 16/11* | (2019.01) | |
| *H04L 12/58* | (2006.01) | |
| *G06F 16/13* | (2019.01) | |
| *G06F 16/176* | (2019.01) | |
| *G06F 16/951* | (2019.01) | |
| *G06F 16/182* | (2019.01) | |

(52) U.S. Cl.
CPC ........ *G06F 16/119* (2019.01); *G06F 16/1834* (2019.01); *G06F 16/951* (2019.01); *H04L 51/22* (2013.01)

(58) Field of Classification Search
CPC ...... G06F 16/119; G06F 16/176; G06F 16/13; H04L 51/22
USPC .......................................................... 707/624
See application file for complete search history.

(56) References Cited

U.S. PATENT DOCUMENTS

| | | | | |
|---|---|---|---|---|
| 9,264,480 | B1 * | 2/2016 | Saylor | H04L 67/06 |
| 9,294,485 | B2 * | 3/2016 | Allain | H04L 63/104 |
| 9,432,381 | B2 * | 8/2016 | Dyor | H04W 48/04 |

(Continued)

FOREIGN PATENT DOCUMENTS

| | | | | | |
|---|---|---|---|---|---|
| KR | 20130079897 A | * | 7/2013 | | H04L 67/1089 |
| KR | 20160001463 A | * | 1/2016 | | H04L 67/1089 |

OTHER PUBLICATIONS

Shen et al., "Controllable Information Sharing for User Accounts Linkage across Multiple Online Social Networks", in Proceedings of the 23rd ACM International Conference on Conference on Information and Knowledge Management (CIKM '14), Nov. 2014, pp. 281-290. (Year: 2014).*

*Primary Examiner* — Phuong Thao Cao
(74) *Attorney, Agent, or Firm* — James J. DeCarlo; Greenberg Traurig, LLP

(57) ABSTRACT

Systems and methods for sharing information from a first user account to a second user account selectively and seamlessly. The systems and methods can be implemented by server(s) that analyze electronic transactions between the first user account and the second user account to determine appropriate queries for the accounts for sharing information. Such queries can include queries for file permissions. Also, the server(s) can generate sharing instructions according to results of the queries. The server(s) can also select electronic content items for sharing according to the generated sharing instructions. And, the server(s) can direct storage of a copy of the selected electronic content items of the first user account into a data structure of the second user account, such that access by the second user account to the selected items from the first account is as seamless as accessing electronic content items originated by the second user account.

20 Claims, 7 Drawing Sheets

(56) References Cited

U.S. PATENT DOCUMENTS

| | | | | |
|---|---|---|---|---|
| 9,565,175 B1* | 2/2017 | Saylor | | G06F 21/10 |
| 9,626,527 B2* | 4/2017 | Ali | | G06F 21/6218 |
| 9,967,339 B2* | 5/2018 | Piyush | | H04L 67/1095 |
| 9,984,125 B1* | 5/2018 | Smith | | G06F 16/24568 |
| 10,025,949 B2* | 7/2018 | Sirbu | | G06F 12/1483 |
| 10,157,614 B1* | 12/2018 | Devaraj | | G10L 15/22 |
| 10,198,140 B2* | 2/2019 | Kirigin | | G06F 3/048 |
| 10,264,067 B2* | 4/2019 | Subramani | | H04L 67/1046 |
| 10,505,914 B2* | 12/2019 | Hitchcock | | G06F 21/41 |
| 2007/0162432 A1* | 7/2007 | Armstrong | | G06F 16/9535 |
| 2011/0270748 A1* | 11/2011 | Graham, III | | G06Q 40/00 |
| | | | | 705/40 |
| 2013/0198818 A1* | 8/2013 | Hitchcock | | H04L 63/08 |
| | | | | 726/5 |
| 2013/0198823 A1* | 8/2013 | Hitchcock | | H04L 63/102 |
| | | | | 726/6 |
| 2013/0311598 A1* | 11/2013 | Arrouye | | H04L 67/1097 |
| | | | | 709/217 |
| 2014/0188796 A1* | 7/2014 | Fushman | | G06F 16/13 |
| | | | | 707/624 |
| 2014/0215551 A1* | 7/2014 | Allain | | H04L 63/104 |
| | | | | 726/1 |
| 2014/0237347 A1* | 8/2014 | Jeyachandran | | G06F 40/169 |
| | | | | 715/234 |
| 2014/0344352 A1* | 11/2014 | Mohnani | | G06F 16/168 |
| | | | | 709/204 |
| 2014/0358806 A1* | 12/2014 | DiVincenzo | | G06Q 30/00 |
| | | | | 705/319 |
| 2015/0149358 A1* | 5/2015 | Robbin | | G06F 21/10 |
| | | | | 705/44 |
| 2015/0215261 A1* | 7/2015 | Zhang | | H04L 51/16 |
| | | | | 709/206 |
| 2015/0222580 A1* | 8/2015 | Grue | | H04L 67/1095 |
| | | | | 709/206 |
| 2015/0278546 A1* | 10/2015 | Uekubo | | G06Q 50/10 |
| | | | | 726/28 |
| 2015/0281203 A1* | 10/2015 | Granstrom | | H04L 63/102 |
| | | | | 726/4 |
| 2015/0296012 A1* | 10/2015 | Piyush | | G06F 21/6245 |
| | | | | 726/1 |
| 2015/0347996 A1* | 12/2015 | Alsina | | G06Q 20/29 |
| | | | | 705/44 |
| 2016/0034459 A1* | 2/2016 | Larsen | | G06F 16/489 |
| | | | | 707/740 |
| 2016/0292443 A1* | 10/2016 | von Muhlen | | G06F 21/6218 |
| 2016/0308798 A1* | 10/2016 | Magistrado | | H04L 51/046 |
| 2016/0381172 A1* | 12/2016 | Lopiano | | H04W 4/21 |
| | | | | 709/204 |
| 2016/0381324 A1* | 12/2016 | Li | | H04W 12/08 |
| | | | | 348/143 |
| 2017/0310789 A1* | 10/2017 | Thomee | | H04L 67/327 |
| 2018/0048760 A1* | 2/2018 | Zhao | | H04L 29/06176 |
| 2018/0146169 A1* | 5/2018 | Sinninoff | | G06F 40/40 |
| 2018/0174128 A1* | 6/2018 | Deguara | | G06Q 20/24 |
| 2018/0285357 A1* | 10/2018 | Chang | | G06K 9/00677 |
| 2018/0336234 A1* | 11/2018 | Jatzold | | G06F 3/0484 |
| 2019/0244203 A1* | 8/2019 | Phillips | | G06Q 30/0215 |

\* cited by examiner

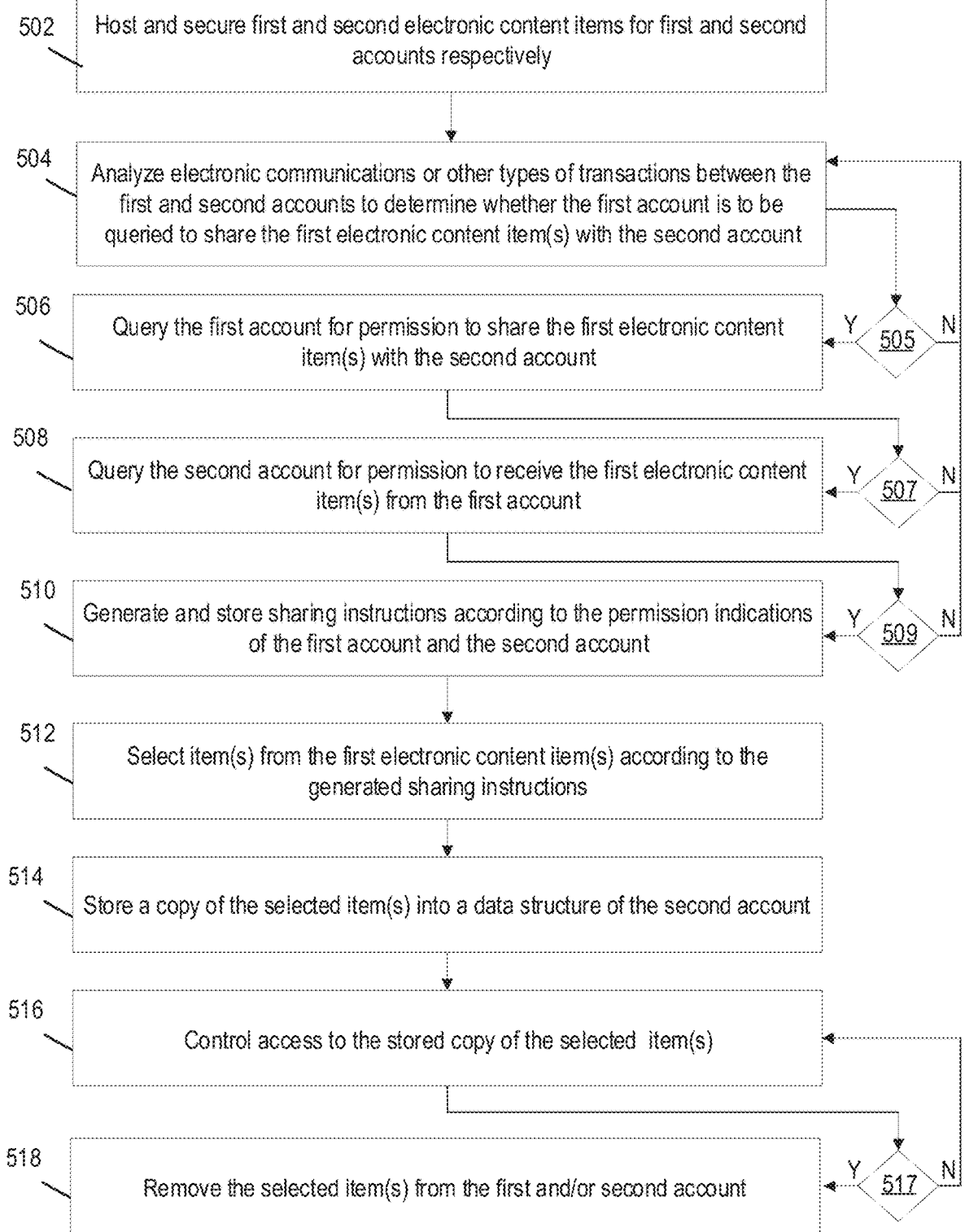

602 — Determine a number of instances of separate communications and/or other types of transactions between the first account and the second account

604 — Determine the first account is to be queried to share the first electronic content item(s) with the second account when the determined number of instances of transactions between the first user account and the second user account exceeds a threshold

702 — Query the first user account for permission indications as to types of information it will share Share emails?

Share images?

Share documents?

Share coupons?

Share travel information?

Share calendar items?

Etc...

802 — Query the second user account for permission indications as to types of information it will receive Will receive shared emails?

Will receive shared images?

Will receive shared documents?

Will receive shared coupons?

Will receive shared information?

Will receive shared calendar items?

Etc...

FIG. 9

902 — Query the first user account for access control parameters

904 — Receive access control parameters from the first user account

906 — Control the access to the stored copy of the selected electronic content item(s) according to the received access control parameters

SELECTIVE DATA MIGRATION AND SHARING

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates to selective migration and sharing of data between accounts, such as electronic email accounts.

BACKGROUND

Online services (such as online email and social media services) provide sharing of information through different types of communications, such as emails, posts, and messages. An item of information can be shared through online services. A document file, a contacts file, an image file, or any other type of file are examples of items of information. For instance, emails, posts, and messages can include an item of information as an attachment that can be shared through online services.

The sharing of information items (also known as content items) in conventional online services is usually through messages, emails, or posts. And, this can be problematic. One problem common to messages, emails, and posts are that such communications are initiated by a user or an automated process acting as a user. Such systems can have problems with efficiency and can be a tax on computer and network resources. For an information item to be shared through a communication (such as a message, email, or post), corresponding data must be communicated, negotiated, and processed to support the communication. Such operations use computer and network resources in addition to the resources used to share the content item associated with or attached to the communication. Further, because messages, emails, and posts usually rely on an end user to be initiated, such communications can be overlooked. Thus, consistency in sharing of items can be suspect as well.

In addition to usually being limited by human error and being a tax on computer and network resources, another problem common to messages, emails, and posts in online services is that the communications are sent or posted to a recipient without being selectively blocked or filtered by the sender or poster. The communications, if blocked or filtered, are usually restricted by the receiver of the communication. In other words, messages, emails, and posts are not usually selectively sent once such communications are commenced. This can be a serious problem in general because often sensitive items can be sent by accident. Also, such communications can be an unnecessary load on the communication link or channel if the content item has a large file size. For example, a common technical problem is that a file attachment is sent or posted and then such an attachment can overwhelm a link or channel. Also, even if there are safeguards implemented by a network to block, breakup, or filter large files, the safeguards use processing and network bandwidth resources that could have been preserved with outgoing filters that filter or block communications before the communications are sent over a network. There are some known outgoing filters for messages and emails that are beyond the scope of this application, but often such mechanisms use a significant amount of computer resources on the sender side of a communication.

In general, through conventional online services, sharing of content items is not direct in that the sharing relies on an additional function of the service such as a posting, messaging, or emailing function. However, there are known online services that allow for collaborative editing and reviewing of information items without relying on an email, message, or post for the most part. But, with such services, information items are not selectively shared between two or more accounts. For instance, the contents of the item shared through such systems are usually exposed similarly to each account that has access. For example, in a shared word processing document in a collaborative editing system, sensitive information is not restricted by the system itself. Also, returning to the problems already discussed, the initiation of sharing each individual item or file relies on the activation by one or more end users, and often relies on the back and forth communications of at least two end users. For example, a communication is usually required to invite a user to edit or review a content item in an online collaborative editing system, and then another communication is often required to accept the invite, thus further burdening the network.

Alternatively, but still problematic, a posting (such as through a blog or a social media site) provides a mechanism for a user of an account to share information to many users and accounts without initiating separate communications per receiving account. Thus, the resources used in negotiations between multiple accounts is avoided. However, an issue with posting information and items through blogs or social media sites is that such data is not selectively distributed beyond the selection of the group selected to receive the data. Known online services do not provide an automated way for selecting precisely what type of information is shared or migrated from one particular account to another particular account or a particular group of accounts. And, as mentioned, even when a post is used to communicate information to many different accounts an individual post still needs to be initiated by a user of the account making the post. Further, when such a limitation is overcome with automation in conventional systems, the automation of posting information still requires an individual to provide instructions to a service on how to provide the automated postings.

There are multiple methodologies to transfer files, datasets, and data subsets between accounts directly, but known techniques for direct sharing have not completely overcome the aforesaid problems with online services. Thus, improvement is needed.

SUMMARY

Provided herein are a related set of technical solutions for eliminating or at least reducing problems associated with inefficiencies and insecurities in sharing information items between accounts in online services. For instance, the solutions eliminate a user account's need to initiate a post, email, or message to share a content item with another account. Also, for example, the techniques disclosed herein solve the issue of migrating specific subsets of data between user accounts with a sharing account initiating transfers directly, e.g., contacts, photos, documents, and emails can be migrated between accounts according to specific criteria with one action by an initiating account.

In addition, fine grain selectivity can be implemented with the techniques described herein. For instance, the sharing account can specifically share subsets of data, such as top contacts, photos from a certain location, and documents of a certain kind, just to point out a few examples.

The features disclosed herein can also be leveraged to share data subsets between two or more accounts with a primary account being a controller of the sharing of the data. For instance, this can be beneficial because a user can receive coupons in an email and share all emails with coupons with a selected user without separately forwarding each email with a coupon to that user, thus preserving network resources. And, the sharing user can be in control. Such sharing does occur in conventional online services, but the sharing relies on additional steps even if some of those steps are automated. Unlike conventional systems that can have automated procedures for forwarding such emails automatically, the system disclosed herein bypasses the forwarding of emails and directly duplicates the information items from a sharing account into a receiving account. The emails now exist automatically in both mailboxes by direct sharing. No email forwarding has occurred; and thus, overhead is reduced and the email server processing and communications resources have been spared from message forwarding processes.

Also, one feature in which control is provided to a primary account, the primary account can remove shared items directly by controlling the system to delete the shared items. The system recognizes and is permitted to delete such items from another account by a log showing such permissions derived from a logging of the sharing or by tags or metadata linked to shared items. In some embodiments, a system log separate from the shared items can track permissions on the items. Also, a log can be within a content item itself through metadata including in the item. For instance, a shared file can include a tag with metadata the provides the permissions and other types of control parameters associated with the file.

In some examples, the system can initiate and successfully transfer data subsets from the sharing account to the receiving account. The system can also inherently be flexible enough to identify specific subsets such as top contacts, tax documents, photos of a certain person without overly using system resources. The flexibility occurs because sharing from one account to another is direct and does not require additional services (such an email forwarding, messaging, or posting services that utilize network resources). Also, the features described herein are beneficial for sharing with other users and accounts of one user.

In general, the system leverages multiple existing indexes of entities and categories across different platforms to identify different datasets and subsets such as for contacts files, image files, and documents files. When one or more end users connect two accounts (irrespective of domain), the system can then provide options to the user(s) on whether the user(s) want to initiate a transfer or simply share some or all datasets, subsets, and items. When the user(s) select a transfer of data or content items such as files, the system then presents options for the user to select certain types of data, subject matter, or files, for example. The system can also provide a list of different subsets within a dataset or a list of categories and sub-categories of data or particular types of content items such as files. Also, a user can define particular sets of data because of the flexibility and simplicity of the system. To put it another way, dataset and subset definitions can be created by the end user. Once the user verifies such sets of data or files and permits the transfer of information, the system can perform duplications of data from the sharing account to the receiving account automatically and seamlessly in the background without taxing resources beyond the resources in the system required to duplicate and transfer data from one account repository to another account repository. The data can be ported over to the destination account and then the recipient end user can receive a notification in some embodiments. Also, in some embodiments, the transfer of data can occur over encrypted channels.

In some embodiments, the system provides the option to specifically share a particular item or group of items in one instance of a transfer. The primary account holder can have the option to retain control of any modification to the data or the transfer of data. For example, control can be provided regarding filtering of the data transferred or the routine in which the data is transferred. An end user can share a set of messages from one account to another account of the same user for specific items (e.g., tax documents only can be selected to be shared from a primary account to a secondary account of the end user). If the end user so chooses, the user can terminate the sharing between accounts of the specific items and such items can be automatically removed from the secondary account and/or the primary account. Also, different permissions can be granted on datasets or files according to the account in which such information is stored. The functionality of control can be implemented through a system log separate from the datasets and items shared or part of the shared items and datasets in the form of tags or metadata. Permissions can include different types of read, write, and execution permissions.

The aforesaid functions of the system can also be secured through encryption and access to the data can occur through different kinds of end user verification systems such as those that use simple mechanisms such as usernames and passwords, and more sophisticated techniques such as retinal scan or fingerprinting authentication systems.

As disclosed herein, the technical benefits of the system are numerous. For example, an end user can initiate transfers of very specific data sets and items, and such transfers can become routines that do not rely on end user input besides in the initiation phase. In conventional online data sharing services, often with account to account transfers, a transfer is initiated by the recipient with an import request. If the user has to initiate the transfer, it can only happen through downloads and re-uploads into the destination account or selection of specific files and transferring the same via messaging or other means in specific formats or communications. The system described herein is not burdened by such limitations in that data and information items are directly ported or duplicated and transferred from one account to another account according to pre-selected criteria automatically. Contacts in an address book, photos and documents, and other content items of an email account or social media account for example, can be selectively transferred to another account without the use of messaging, email forwarding, or posting procedures that tax network resources. And, the selectiveness and control of the transfers and transferred data can simply be implemented by software that uses inputs from a system log and/or metadata in or associated with the items.

In accordance with one or more embodiments, this disclosure provides computerized methods, systems, and a non-transitory computer-readable storage medium for sharing information from a sharing user account to a receiving user account selectively and seamlessly. The non-transitory computer-readable storage medium has tangibly stored thereon, or tangibly encoded thereon, computer readable instructions that when executed by one or more processors of a service server and a migration server, or the like, cause at least one processor to perform a method for a novel and improved way of sharing information from a first user account to a second user account selectively and seamlessly.

In accordance with one or more embodiments, functionality is embodied in steps of a method performed by at least one computing device. In accordance with one or more embodiments, program code (or program logic) executed by processor(s) of one or more computing devices to implement functionality in accordance with one or more embodiments described herein is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 5-9 are flowcharts illustrating operations in accordance with some embodiments of the present disclosure.

DESCRIPTION OF EMBODIMENTS

Figure 1:
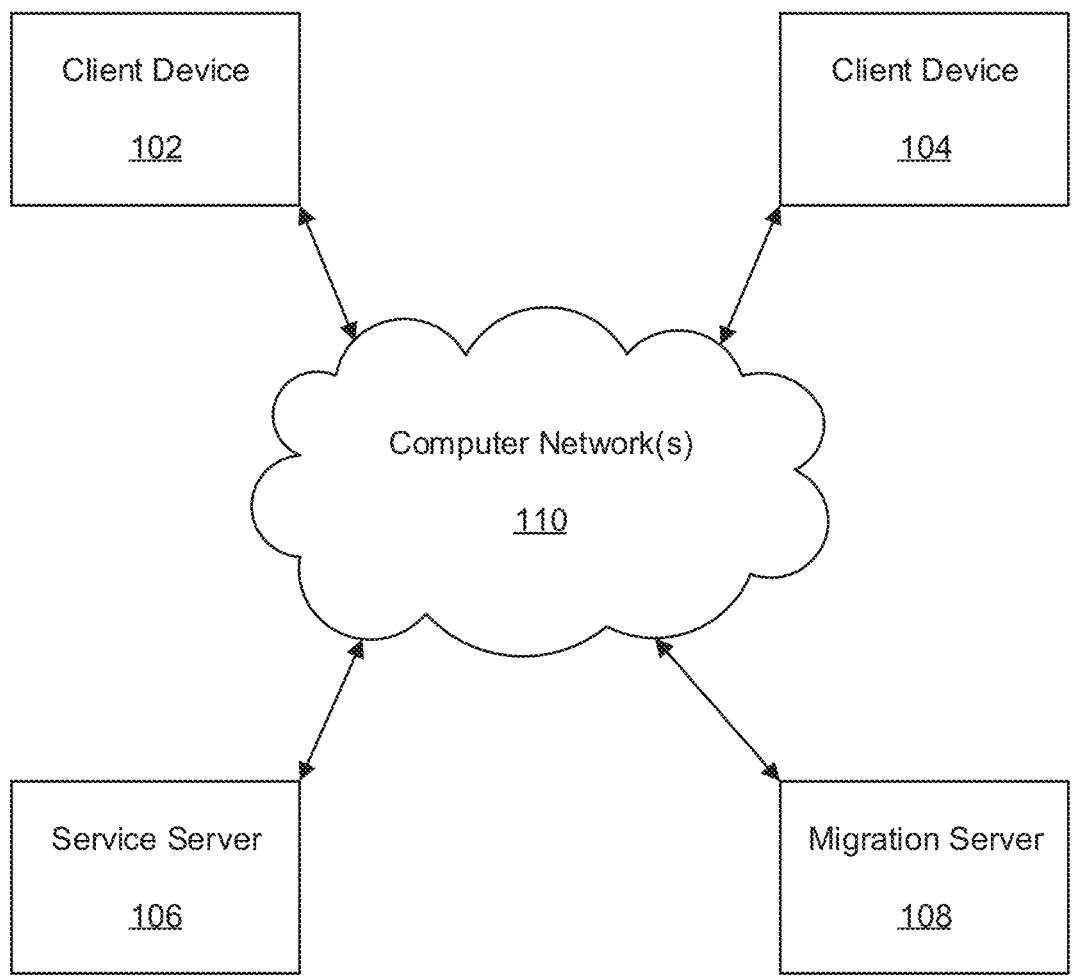
FIG. 1 is a schematic diagram illustrating an example of a network within which systems and methods disclosed herein can be implemented.

Subject matter will now be described with reference to the accompanying drawings which show illustrative embodiments. Subject matter can, however, be embodied in a variety of different forms and the claimed subject matter is intended to be construed as not being limited to any example embodiments. Likewise, a reasonably broad scope for claimed or covered subject matter is intended. Among other things, subject matter can be embodied as methods, devices, components, or systems. Accordingly, embodiments can, for example, take the form of hardware, software, firmware or any combination thereof (other than software per se).

Throughout the specification and claims, terms can have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology can be understood at least in part from usage in context. For example, terms, such as "and", "or", or "and/or," as used herein can include a variety of meanings that can depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and can, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to: a processor of a general purpose computer to alter its base functions as detailed herein; a special purpose computer; ASIC or other programmable data processing apparatus, such that the instructions when executed implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable in machine readable form. By way of non-limiting example, a computer readable medium can include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module can be stored on a computer readable medium for execution by a processor. Modules can be integral to one or more computing devices, client devices, servers, or be loaded and executed by one or more of such devices. One or more modules can be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

For the purposes of this disclosure the term "machine learning" described herein is a subset of artificial intelligence that uses statistical techniques to give computers the ability to progressively improve performance on a specific task with data, without being explicitly programmed. Machine learning mentioned herein can include decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule-based machine learning, learning classifier systems, or feature selection approach.

The principles described herein can be embodied in many different forms. The disclosed systems and methods provide a novel and improved way of sharing information from a first user account to a second user account selectively and seamlessly. The system and methods can be an improvement over known ways of sharing information from a first user account to a second user account in the content of the Internet.

As discussed in more detail below, the disclosed systems and methods provide advanced functionality, from a service server and a migration server, or the like, for improved sharing of information from a sharing user account to a receiving user account.

Certain embodiments will now be described in greater detail with reference to the figures. FIG. 1 shows components of a general environment in which the systems and methods discussed herein can be practiced. Not all the components can be required to practice the disclosure, and variations in the arrangement and type of the components can be made without departing from the spirit or scope of the disclosure.

FIG. 1 is a schematic diagram illustrating an example of a network 100 within which systems and methods disclosed herein can be implemented. As shown, the network 100 of FIG. 1 includes client devices 102 and 104, servers 106 and 108, and one or more computer networks 110. Any one of the client devices 102 and 104 and servers 106 and 108 can communicate with another one of the client devices and servers through the computer network(s) 110. The service server 106 and/or the migration server 108 can include a device that includes a configuration to perform at least some of the operations of the processes illustrated in FIGS. 4-9.

A server can include one or more computers that can run a service point which provides processing, database, or communication facilities. By way of example, and not limitation, such a server can include a single physical processor with associated communications and data storage and database facilities, or it can refer to a networked or clustered complex of processors and associated network and storage devices, as well as operating software and one or more database systems and application software that support the services provided by the server. Servers can vary widely in configuration or capabilities, but generally such devices can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, or FreeBSD.

A server can include authentication servers, search servers, email servers, social networking services servers, SMS servers, IM servers, MMS servers, exchange servers, photo-sharing services servers, and travel services servers. In some embodiments, applications, such as a mail or messaging application (e.g., Yahoo!® Mail, Yahoo!® Messenger), a photo sharing/user-generated content (UGC) application (e.g., Flickr®, Tumblr®, and the like), a streaming video application (e.g., Netflix®, Hulu®, iTunes®, Amazon Prime®, HBO Go®, and the like), a blog, a photo or social networking application (e.g., Facebook®, Twitter® and the like), and a search application (e.g., Yahoo!® Search), can be hosted by a server. Thus, a server can store various types of applications and application related information including application data and user profile and account information. It should also be understood that a server can also store various types of data related to the content and services provided in an associated database. Such server(s) can also host a variety of other sites, including, but not limited to business sites, educational sites, dictionary sites, encyclopedia sites, wikis, financial sites, government sites, and the like. Devices that can operate as such server(s) include personal computers desktop computers, multiprocessor systems, microprocessor-based or programmable consumer electronics, network PCs, servers, and the like.

A server can provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content can include videos, text, audio, images, or the like, which can be processed in the form of physical signals, such as electrical signals, for example, or can be stored in memory, as physical states, for example.

Although FIG. 1 illustrates servers 106 and 108 as single computing devices, respectively, the disclosure is not so limited. For example, one or more functions of a server can be distributed across one or more distinct computing devices. Moreover, in one embodiment, multiple servers can be integrated into a single computing device, without departing from the scope of the present disclosure.

Either of the servers 106 and 108 can include and/or use a search engine and related technologies discussed below (e.g., the transactions analysis module 320 and the migration controller module 328 of the migration server 108 can use a search engine and related technologies). The servers or the search engine can use a crawler and/or indexing as well as other search technologies. A search engine enables a device to search for content of interest using a search query. A search engine can include one or more servers, one or more of such servers acting as a crawler, indexer, index storage, search application, ranking application, cache, profile storage, logon subsystem, profile builder application, and one or more application program interfaces (APIs).

A crawler is a computing device (and/or software thereon) that crawls a network to identify and, in some embodiments, cache content located on the network. As an example, a web crawler visits URLs in a seed list of URLs, identifies hyperlinks in the page and adds them to a list of URLs to visit. These URLs are then recursively visited according to a set of policies.

An indexer can be operable to generate an index of content in, for example, one or more databases, which can be searched to locate content. An index can include index entries, wherein an index entry can be assigned a value referred to as a weight. In some embodiments, an indexer can use an inverted index that stores a mapping from content to its locations in a database file, or in a document or a set of documents. A record level inverted index contains a list of references to documents for each word. A word level inverted index additionally contains the positions of each word within a document. A weight for an index entry can be assigned. For example, a weight, in one example embodiment can be assigned substantially in accordance with a difference between the number of records indexed without the index entry and the number of records indexed with the index entry.

The term "Boolean search engine" refers to a search engine capable of parsing Boolean-style syntax, such as can be used in a search query. A Boolean search engine can allow the use of Boolean operators (such as AND, OR, NOT, or XOR) to specify a logical relationship between search terms.

"Semantic search" refers to a search technique in which search results are evaluated for relevance based at least in part on contextual meaning associated with query search terms. A semantic search attempts to infer a meaning for terms of a natural language search query by employing "semantics" (e.g., science of meaning in language) to search repositories of various types of content.

Search results can typically be ranked. In an embodiment, search results can be ranked by scoring located files or records, for example, such as in accordance with number of times a query term occurs weighed in accordance with a weight assigned to an index entry corresponding to the query term. Other aspects can also affect ranking, such as proximity of query terms within a located record or file, or semantic usage, for example. A score and an identifier for a located record or file, for example, can be stored in a respective entry of a ranking list. A list of search results can be ranked in accordance with scores, which can, for example, be provided in response to a search query. In some embodiments, machine-learning models are used to rank search results.

Either of the servers 106 and 108 as well as other aspects of the network 100 can include and/or use a personalization framework. The personalization framework can be implemented through contextual content, annotation of various content (tags), and a profile builder, for example.

In one embodiment, as an individual interacts with a software application descriptive content (e.g., email addresses, phone numbers, postal addresses, message content, dates, times, etc.) can be identified. Descriptive content can be stored, typically along with contextual content. For example, how a phone number came to be identified (e.g., it was contained in a communication received from another via an instant messenger application) can be stored as contextual content associated with the phone number. Contextual content, can, for example, be used to subsequently search for associated descriptive content. For example, a search for phone numbers received from specific individuals, received via an instant messenger application or at a given date or time, can be initiated.

Content within a repository of media or multimedia, for example, can be annotated. The term "annotation," as used herein, refers to descriptive or contextual content related to a content item, for example, collected from an individual, such as a user, and stored in association with the individual or the content item. Annotations can include various fields of descriptive content, such as a rating of a document, a list of keywords identifying topics of a document, etc.

A profile builder can initiate generation of a profile for users of an application, such as a search engine. A user profile can be used to enhance the application. For example, a user profile stored by a search engine can be used to enhance relevance determinations and assist in indexing, searching or ranking search results. A variety of mechanisms can be implemented to generate a profile including, but not limited to, collecting or mining navigation history, stored documents, tags, or annotations, to provide a few examples. Profiles of users of a search engine, for example, can give a search engine provider a mechanism to retrieve annotations, tags, stored pages, navigation history, or the like, which can be useful for making relevance determinations of search results, such as with respect to a particular user.

Each of the client devices 102 and 104 can include a device that includes a configuration to perform at least some of the operations described herein (such as at least some of the operations of or can be associated with FIGS. 4-9). A client device can be configured to send and receive signals such as through a wired transmission media or a wireless transmission media. A client device can, for example, can include a desktop computer, a portable device (such as a smart phone, a tablet computer, a laptop computer, or a wearable computer such as a smart watch), an Internet of Things (IoT) device (such as a vehicle or home appliance with embedded electronics, software, actuators, sensors, and interfaces to networks such as the Internet), or an integrated or distributed device combining various features, such as features of the forgoing devices, or the like. For example, a client device can include one or more physical or virtual keyboards, mass storage, one or more sensors and actuators, a global positioning system (GPS) or other location—identifying type capability, or a display with a high degree of functionality, such as a display with a 2D or 3D touchscreen. A client device can include or execute a variety of possible applications such as an operating system. Operating systems can include a personal computer operating system, such as a Windows, iOS or Linux, or a mobile operating system, such as iOS, Android, or Windows Mobile. The possible applications can also include client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device can also include or execute an application to communicate content, such as, for example, textual content or multimedia content. A client device can also include or execute an application to perform a variety of possible tasks, such as browsing, searching, playing, streaming or displaying various forms of content, including locally or remotely stored images or video, or games (such as fantasy sports leagues). Client devices can vary widely in configuration or capabilities, but generally such devices can include one or more central processing units and memory.

When any one of the client devices 102 and 104 is referred to as a mobile device, such a device is small enough to be held and operated by one or two hands of a person. In some examples, a mobile device has a touchscreen interface with digitally derived buttons and keyboard or physical buttons along with a physical keyboard or keypad. A mobile device can connect to the Internet and interconnect with other devices such as an IoT device or another type of network connected device via Wi-Fi, Bluetooth, cellular networks or near field communication (NFC). Power can be provided to a mobile device by a battery or other wireless power source such a solar power source.

Although FIG. 1 illustrates client devices 102 and 104 as single computing devices, respectively, the disclosure is not so limited. For example, one or more functions of a client device can be distributed across one or more distinct computing devices. Moreover, in one embodiment, multiple client devices can be integrated into a single computing device, without departing from the scope of the present disclosure.

The computer network(s) 110 is a telecommunications network including one or more wired or wireless computer networks. A computer network within the computer network(s) 110 can include nodes and data links between nodes. The data links can be established over a cable media such as wires or optic cables, or a wireless media such as through radio or light waves. The nodes can include a server, a client device, or a network device such as a firewall, gateway, hub, modem, multiplexer, network bridge, protocol converter, proxy server, router, switch, or other related hardware. The computer network(s) 110 can include the Internet, a local area network (LAN), a wide area network (WAN), or a metropolitan area network (MAN)—also known as a middle area network—to connect computers in a geographic area larger than that covered by a LAN but smaller than the area covered by a WAN. Aspects of the network 100, such as a node or a computer network of the computer network(s) 110 can be implemented using a protocol used for communications over a telecommunications network. Communications over one of the networks can include signal formations (such as signal packets) communicated over a data link, and the communications can be controlled by a set of communications protocols such as the Internet protocol or TCP/IP suite.

With respect to FIG. 1, the foregoing is provided to illustrate that claimed subject matter is intended to include a wide range of possible features or capabilities. For instance, cloud computing, peer-to-peer networking, and various client-server configurations can be implemented through the network 100. Also, a "content delivery network" or "content distribution network" (CDN) can be implemented through the network 100.

A "content delivery network" or "content distribution network" (CDN) generally refers to a distributed content delivery system that includes a collection of computers or computing devices linked by a network or networks, such as a collection of computers or computing devices linked by a network or networks in network 100 of FIG. 1. A CDN can employ software, systems, protocols or techniques to facilitate various services, such as storage, caching, communication of content, or streaming media or applications. Services can also make use of ancillary technologies including, but not limited to, "cloud computing," distributed storage, DNS request handling, provisioning, signal monitoring and reporting, content targeting, personalization, or business intelligence. A CDN can also enable an entity to operate or manage another's site infrastructure, in whole or in part.

A peer-to-peer (or P2P) network can employ computing power or bandwidth of network participants in contrast with a network that can employ dedicated devices, such as dedicated servers, for example; however, some networks can employ both as well as other approaches. A P2P network can typically be used for coupling nodes via an ad hoc arrangement or configuration. A peer-to-peer network can employ some nodes capable of operating as both a "client" and a "server." A collection of computers or computing devices illustrated in FIG. 1 or described as possibly included in computer network 110 can implement a P2P network.

According to some embodiments, the present disclosure can be utilized within or accessible to an electronic social networking site or platform. The term "social network" refers generally to an electronic network of individuals separated by varying degrees of separation, such as, but not limited to, acquaintances, friends, family, colleagues, like-minded individuals, persons who share certain interests or characteristics, or co-workers, that are coupled via a communications network or via a variety of sub-networks. Potentially, additional relationships can subsequently be formed as a result of social interaction via the communications network or sub-networks.

An individual's social network can represent electronic, networked connections with other individuals that refer to a set of direct personal relationships or a set of indirect personal relationships. A direct personal relationship refers to a relationship for an individual in which communications can be individual to individual. An indirect personal relationship refers to a relationship that can be available to an individual with another individual although no form of individual to individual communication or established connection can have taken place (such as for example a friend of a friend). Different privileges or permissions can be associated with such relationships, such as, for example, being based on differing degrees of separation between contacts on the network. For example, a type or form of relationship (or degree of separation) can dictate access, sharing, edit and viewing privileges for all or a portion of an individual's content. Similarly, a social network also can facilitate the generation of relationships or connections with entities other than a person, such as, for example, companies, brands, events, locations, or so-called 'virtual persons'.

Multi-Modal communication can occur between members of a social network. In some embodiments, users (e.g., individuals or entities) within one or more social networks can interact or communicate with other users of the same or a different a social network via multi-modal communication via a variety of devices. Multi-modal communication (MMC) technologies refer to a set of technologies that permit interoperable communication across multiple devices or platforms, such as cell phones, smart phones, tablet computing devices, phablets, personal computers, televisions, SMS/MMS, email, instant messenger clients, forums, social networking sites, or the like.

Figure 2:
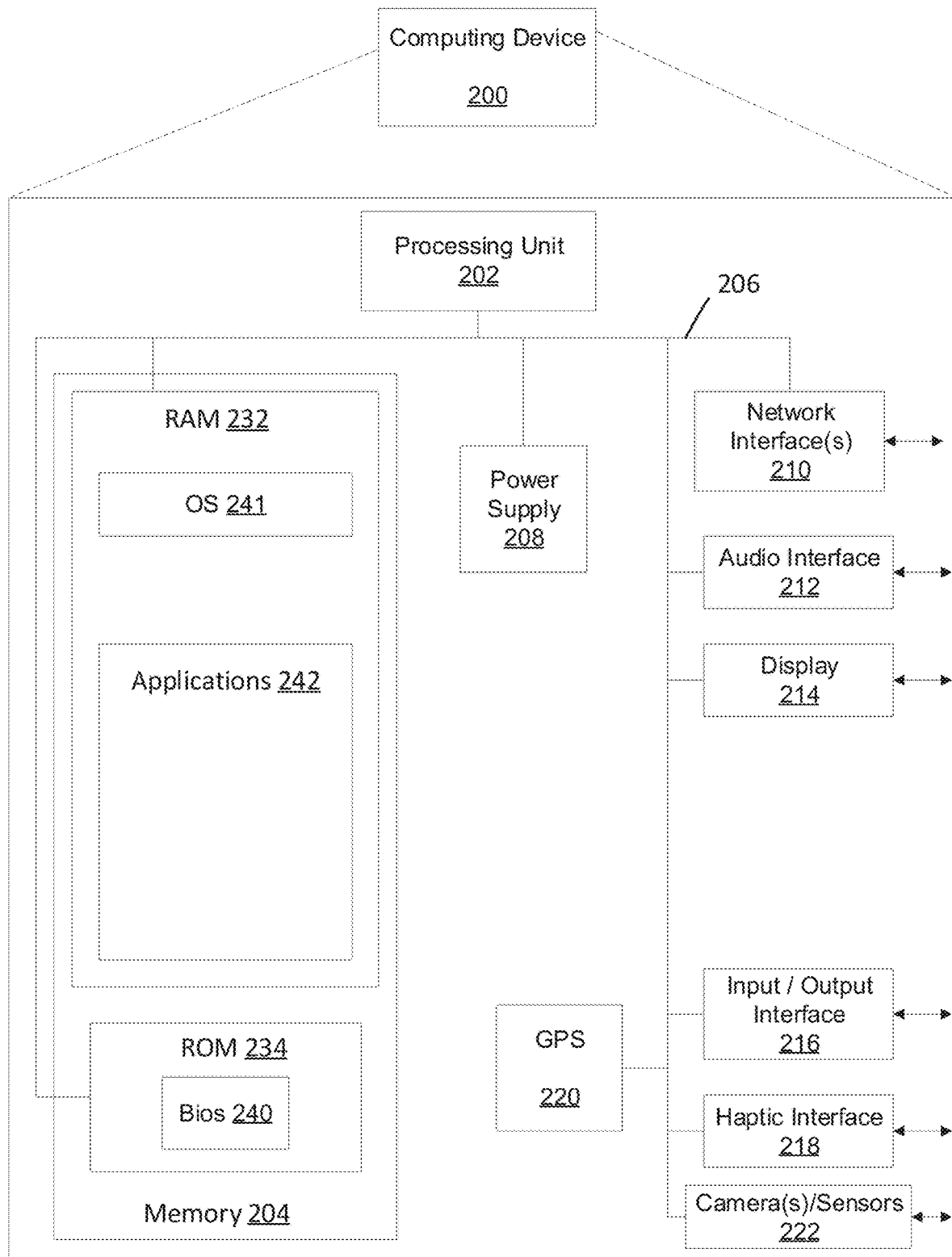
FIG. 2 is a schematic diagram illustrating an example of a computing device in accordance with some embodiments of the present disclosure.

FIG. 2 is a block diagram illustrating an internal architecture of an example of a computing device 200 that can implement one or more of the client devices or servers of at least FIG. 1. The computing device 200 can include a configuration to perform at least some of the operations described herein, such as operations performed in FIGS. 4-9 when implementing a client device or a server. Computing device 200 can include many more or less components than those shown in FIG. 2. However, the components shown are sufficient to disclose an illustrative embodiment for implementing some aspects of a computing device such as a server or a client device.

As shown in the figure, device 200 includes a processing unit 202 (which can include one or more CPUs) in communication with a mass memory 204 via a bus 206. Computing device 200 also includes a power supply 208, one or more network interfaces 210, an audio interface 212, a display 214

(such as a touchscreen), an input/output interface 216, a haptic interface 218, a global positioning system (GPS) receiver 220 as well as one or more cameras or other types of sensors 222. Network interface(s) 210 can include circuitry for coupling device 200 to one or more networks, and is constructed for use with one or more communication protocols and technologies as discussed above. Network interface(s) 210 is sometimes known as a transceiver, transceiving device, or network interface card (NIC). Audio interface 212 is arranged to produce and receive audio signals such as the sound of a human voice. Display 214 can include any type of display used with a computing device. Display 214 can also include a touch sensitive screen. The input/output interface 216 can include a keypad or any other input device arranged to receive input from a user. The input/output interface 216 can also implement communications with external devices, such as a headset, or other input or output devices such physical IoT devices. Input/output interface 260 can utilize one or more communication technologies, such as USB, infrared, or Bluetooth™. Haptic interface 218 is arranged to provide tactile feedback to a user of the device 200.

Mass memory 204 includes a RAM 232, a ROM 234, and other storage means. Mass memory 204 illustrates another example of computer storage media for storage of information such as computer readable instructions, data structures, program modules or other data. Mass memory 204 stores a basic input/output system ("BIOS") 240 for controlling low-level operation of device 200. The mass memory also stores an operating system 241 in RAM 232 for controlling the operation of device 200. Memory 204 further includes one or more data stores, which can be utilized by device 200 to store data in general, among other things, as well as the modules, data, and data structures described herein (such as the modules, data, and data structures described in detail with reference to FIG. 3). For example, data stores can be employed to store information that describes various capabilities of device 200. The information can then be provided to another device based on any of a variety of events, including being sent as part of a header during a communication, sent upon request, or the like. Applications 242, such as provided by the service server 106 and the migration server 108 (e.g., including applications of the service(s) provided by the service server 106 and the modules of the migration server 108), can include computer executable instructions which, when executed by device 200, transmit, receive, or otherwise process audio, video, images, or enable communications with another computing device. Other examples of application programs or "apps" in some embodiments include browsers, calendars, contact managers, task managers, transcoders, photo management, database programs, word processing programs, security applications, spreadsheet programs, games, search programs, and so forth. An Application, such as the applications, functions, and modules described herein can include a search client that is configured to send, to receive, or to otherwise process a search query or search result using any known or foreseeable communication protocols.

Figure 3:
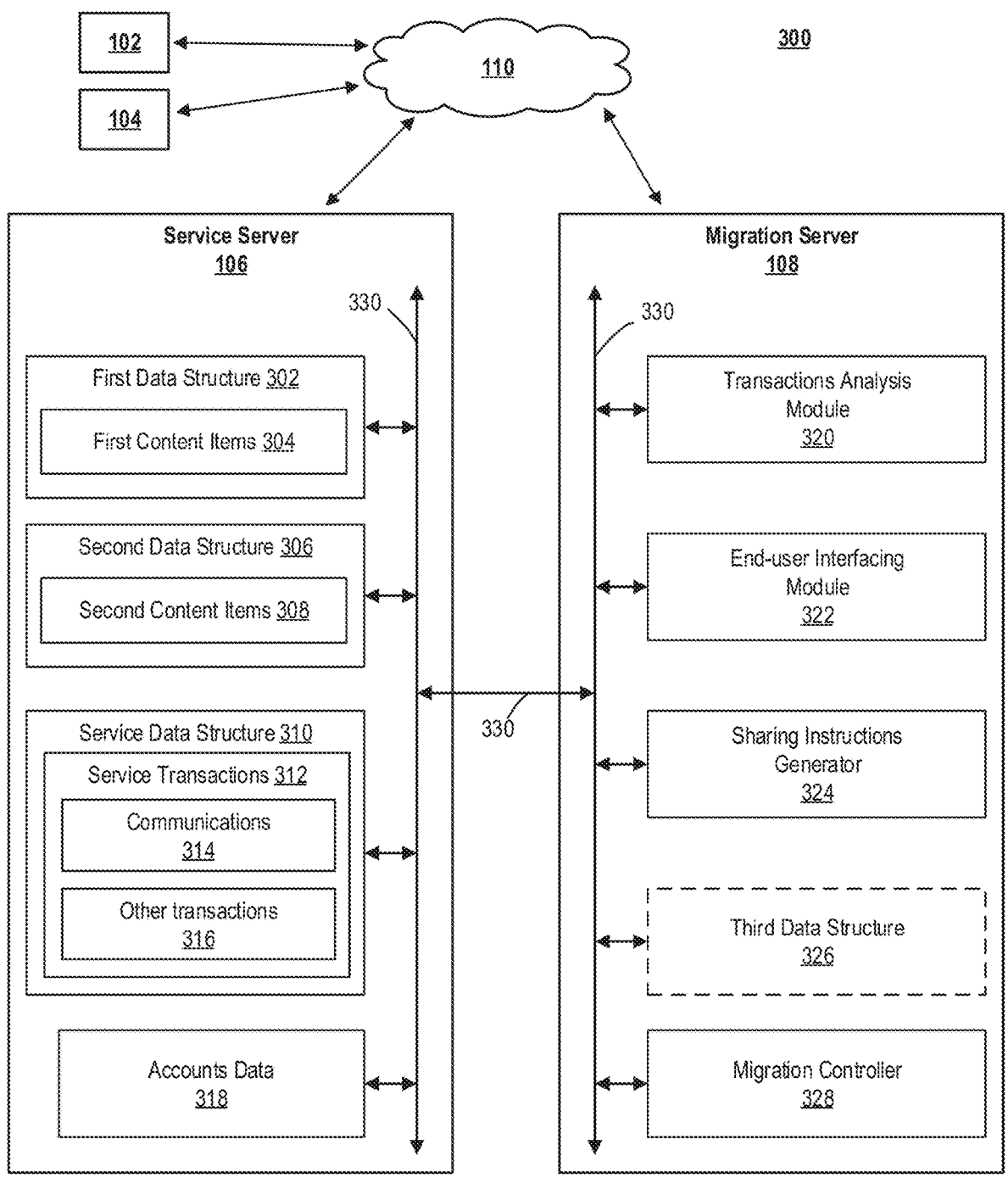
FIG. 3 is a schematic diagram illustrating example components of an exemplary system in accordance with some embodiments of the present disclosure.

In general, FIG. 3 is a schematic diagram illustrating example components of an exemplary system in accordance with some embodiments of the present disclosure. Specifically, FIG. 3 illustrates example components of the service server 106 and the migration server 108. As shown, service server 106 includes a first data structure 302, a second data structure 306, a service data structure 310, and a data structure for organizing and storing accounts data 318. The migration server 108 includes a transactions analysis module 320, an end-user interfacing module 322, a sharing instructions generator module 324, and a migration controller module 328. In some embodiments, the migration server 108 can include a third data structure 326 which can be used as a replacement for the first and second data structures 302 and 306 of the service server 106, in some embodiments.

Figure 4:
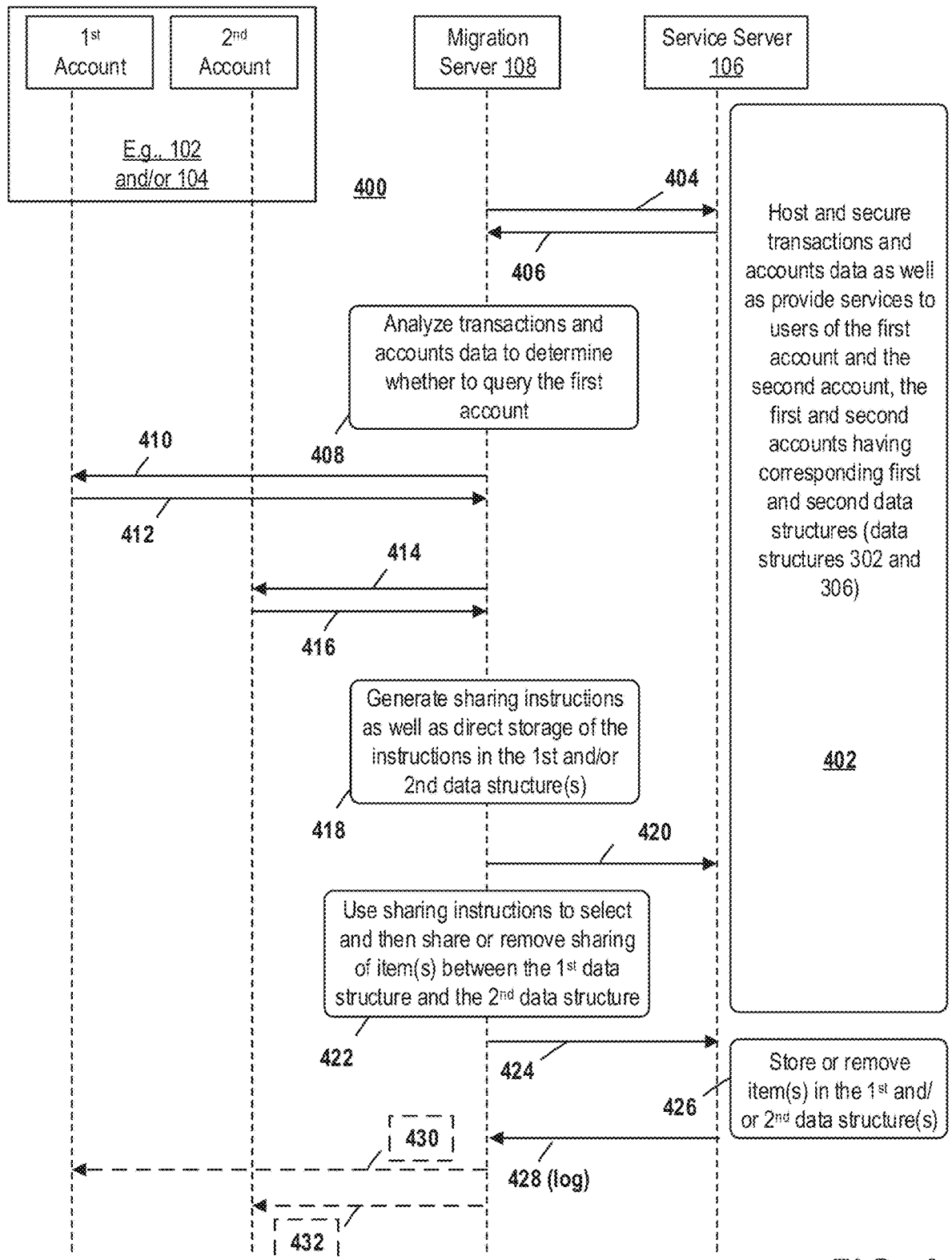
FIG. 4 is a flowchart illustrating operations that can be performed by at least a first user account, a second user account, a migration server, and a service server in accordance with some embodiments of the present disclosure.

The data structures described herein, such as the data structures described with regard to FIGS. 3, 4, and 5, can be or include a linear data structure, a tree data structure, a hash data structure, or a graph data structure, for example. The data structures can also be or include database tables or other types of structures of a database such as tables and other types of structures of a relational database. The data structures described herein can also be a part of a relational database management system (RDBMS).

As illustrated in FIG. 3, service server 106 and migration server 108 can directly communicate with each other via communication bus 330. Alternatively, service server 106 and migration server 108 can communicate via the network (s) 110. Also, as shown, each component of the service server 106 or the migration server 108 can communicate with another component of the service server or the migration server directly via the communication bus 330 or indirectly via the network(s) 110.

The first data structure 302 of the service server 106 is associated with a first user account and includes first content items 304. Specifically, the first data structure 302 is configured to store, host and secure first electronic content items 304. The second data structure 306 of the service server 106 is associated with a second user account and includes second content items 308. Specifically, the second data structure 306 is configured to store, host and secure second electronic content items 308.

The first content items 304 are items associated with a first user account, such as various types of electronic files associated with the first user account. The second content items 308 are items associated with a second user account, such as various types of electronic files associated with the second user account. The first user account can be associated with the same or a different user as the user associated with the second user account. The content items can include document files (such as simple text-based files, word processing files, spreadsheet files, and presentation files), contacts files (such as files that include address and contact information of individuals and other types of entities), image files (such as still or motion image files), audio files, video files, email files, database files, and any other type of electronic or digital file.

The service data structure 310 includes service transactions 312, which are any transactions that are performed by or associated with a service hosted and/or executed by the service server 106. The service transactions 312 include communications 314 and other types of transactions 316. The other transactions 316 can include non-communication type transactions such as payments and money or property transfer transactions. The communications 314 can include any type of electronic communication such as emails, instant messages, text messages, posts (such as blog or social media posts), recorded real-time communications such as recorded telephone calls and recorded audio and visual communications (e.g., a recorded audio visual Internet-based chat). Some of the items of the service data structure 310 can also be a part of the first or second data structure if such items are associated with the first or second user account respectively.

The accounts data structure 318 includes user account information such as in the form of a file per user account. For instance, the first user account can have a first user account information file stored in the accounts data structure 318 and the second user account can have second user account information file stored in the accounts data structure 318. Also, information from the accounts data structure 318 can be duplicated into the first and second data structures 302 and 306 respectively. The user account information files can include or be associated with corresponding user profile files that can be generated through a personalization framework as described herein. For instance, the user account information files can include or be associated with corresponding user profile files that can be generated by a profile builder of the personalization framework.

The transactions analysis module 320 of the migration server 108 is configured to analyze transactions between user accounts. For example, the transactions analysis module 320 can be configured to analyze service transactions 312 which can include the analysis of communications 314 and other types of transactions 316. Such calculations are used to determine whether a user account is to be queried to share its content items with another user account, such as by sharing the items from one data structure (e.g., first data structure 302) of a user account to another data structure (e.g., second data structure 306) of another user account. The transactions analysis module 320 can use the search engine and related technologies described herein to perform its analysis. For instance, search results of the search engine and related technologies can be used as input for the functions of the transactions analysis module 320.

The end-user interfacing module 322 is configured to query the possible sharing account for permission to share its content items with another data structure. This query is in response to determining, by the transactions analysis module 320, that the user account is to be queried for sharing. For instance, in response to determining, by the transactions analysis module 320, that the first user account is to be queried for sharing, the end-user interfacing module 322 is configured to query the first user account for permission to share the first content items 304 with the second user account by transferring the items to the second data structure 306. Also, end-user interfacing module 322 is configured to query the possible receiving account for permission to receive the content items of the sharing account via a transfer of the contents from a data structure of the sharing account to a data structure of the receiving account. This query is in response to the sharing user account permitting sharing its electronic content items with the receiving account. For example, in response to the first user account permitting sharing of the first content item 304 with the second user account, the end-user interfacing module 322 is configured to query the second user account for permission to receive the first content items from the first user account by transferring the items to the second data structure 306.

In response to the receiving user account permitting receiving of the shared content items, the sharing instructions module 324 is configured to generating corresponding sharing instructions according to permission indications of the sharing user account and the receiving user account. For example, the sharing instructions module 324 is configured to, in response to the second user account permitting receiving of the first content items 304, generate corresponding sharing instructions according to permission indications of the first user account and the second user account. The sharing instructions generator module can then direct storing of the sharing instructions. The sharing instructions can be stored by the first data structure 302, the second data structure 306, and/or the third data structure 326.

The migration controller module 328 is configured to select electronic content items from the shared electronic content items according to the generated sharing instructions that were generated by the sharing instructions generator module 324. For example, migration controller module 328 is configured to select content items from the first content items 304 according to the generated sharing instruction. The migration controller module then directs the sharing of the content items from one account to another by storing a copy of the selected electronic content item into the data structure of the receiving account, so that access by the receiving account to the selected content items is as seamless as accessing its own electronic content items. For instance, the migration controller module can direct storing of a copy of the selected electronic content items 304 of the first data structure 302 into the second data structure 306, such that the second data structure 306 then includes second content items 308 and a selection of content items 304. This is beneficial in that access by the second user account to the selected electronic content items of items 304 of the first account is as seamless as accessing the second electronic content items 308. Also, the migration controller module 328 can use the search engine and related technologies described herein to perform some of its various functions. For instance, search results of the search engine and related technologies can be used as input for the functions of the migration controller module 328.

Having described components of the architecture employed within the disclosed systems and methods, the components' operations with respect to the disclosed systems and methods will now be described below with reference to FIGS. 4-6.

Turning to FIG. 4, process 400 details steps performed in accordance with some embodiments of the present disclosure for allowing a first user account to share some of its content items with a second user account. The first user account and the second user account can be associated with the same user or each account can be associated with a different user. Where the accounts are associated with one user, the first user account can be a primary account of the user, and the second user account can be a secondary user account of the user. The second data structure can also be independent of the first data structure. Alternatively, the second data structure can be at least partially dependent on the first data structure. In such examples, the first data structure can be a master data structure and the second data structure can be a corresponding slave data structure. The first user account and the second user account are email accounts, photo-sharing accounts, creatives-sharing accounts, document-sharing accounts, social networking accounts, business enterprise accounts, calendaring accounts, financial accounts, or some combination thereof, or some other type of accounts that can share information.

The sharing of items (e.g., files) from one account's data structure to another account's data structure occurs on the service server 106 or a database associated with the service server 106. The migration of the items from one account to another is managed by the migration server 108, which interacts with the service server 106 and one or more client devices of the account users (such as client devices 102 and/or 104 of FIGS. 1 and 3) to receive input and provide output for controlling the migration of items.

Step 402 of process 400, which includes the storing, hosting, and securing of transactions and accounts data, is performed by the service server 106. Step 402 also includes the service server 106 providing services to the users or user of at least the first and second accounts associated with the first data structure 302 and the second data structure 306 respectively. Step 402 can be ongoing and can occur before, during, or after any of the other steps of FIG. 4. Step 404 includes the migration server 108 requesting data from the data structures of service server 106 to perform analysis on the data or to use data as an input for its other functions. Step 404 can include the transactions analysis module 329 making such requests for data from the first data structure 302, the second data structure 306, the service data structure 310, and the accounts data structure 318. The data requested from the data structures can include data of one or more of the first content items 304, the second content items 308, and the service transactions 312 (e.g., including the communication 314 and the other transactions 316). Step 406 includes the service server 106 sending the requested data according to the request by the migration server 108.

At step 408, upon receiving the requested data, the migration server 108, via the transactions analysis module 320, analyzes the electronic communications between the first user account and the second user account to determine whether the first user account is to be queried to share the first electronic content items 304 with the second user account be copying such items into the second data structure 306. The analyzing by the transactions analysis module 320 can include determining a number of instances of separate communications or other types of transactions between the first user account and the second user account (such as some of the transactions of transactions 312). Then, the analyses can include determining the first user account is to be queried to share the first electronic content items 304 with the second account when the determined number of instances of separate communications or other types of transactions between the first user account and the second user account exceeds a threshold.

At step 410, the migration server 108, via the end-user interfacing module 322, in response to determining that the first user account is to be queried, queries the first user account for permission to share the first content items 304 with the second data structure 306. The querying of the first user account further includes querying the first user account for permission indications as to types of information the first user account will share. The queries are communicated to a client device associated with the first user account such as client device 102 and/or client device 104. Then, at step 412 one or more of the client devices associated with the first user account return answers to the queries of step 410. As shown, the answers are returned to the migration server 108, such as via the end-user interfacing module 322.

At step 414, in response to the first user account permitting sharing of the first electronic content items 304 with the second account, the migration server 108, via the end-user interfacing module 322, queries the second user account for permission to receive, at the second data structure 306, the first electronic content items from the first user account. The querying of the second user account further includes querying the second user account for permission indications as to types of information it will receive at the second data structure 306. The queries are communicated to a client device associated with the second user account such as client device 102 and/or client device 104. Then, at step 416, one or more of the client devices associated with the second user account return answers to the queries of step 414. As shown, the answers are returned to the migration server 108, such as via the end-user interfacing module 322.

At step 418, in response to the second user account permitting receiving of the first electronic content items 304, the migration server 108, via the sharing instructions generator module 324, generates corresponding sharing instructions according to the permission indications of the first user account and the second user account. The permission indications of the first user account and the second user account are included in the answers of steps 412 and 416 respectively. The answers act as input for the sharing instructions generator module 324. Then, at step 420, the generated sharing instructions are stored to the first data structure 302 and/or the second data structure 306. Alternatively, in some embodiments, the generated sharing instructions are stored to the third data structure 302. The migration server 108 directs the storage of the generated sharing instructions, such as shown at step 418. Or, the sharing instructions themselves can provide direction as to where they are to be stored. In some embodiments, the sharing instructions generator module 324 and/or the migration controller module 328 directs the storage of the generated sharing instructions.

At 422, the migration server 108, via the migration controller module 328 selects one or more electronic content items from the first electronic content item 304 according to the generated sharing instructions. Then, at step 424, the migration server 108 communicates the selection of content items to the service server 106 to direct the storing of copies of the selected content item(s) in the second data structure 306. The communication of the selection of content items to the service server 106 can also be for the removal of content item(s) from the first data structure 302 and/or the second data structure 306. At step 426, the service server 106 stores or removes the item(s) according to the communication received from the migration server 108 in step 424. At step 428, the service server 106 returns a record of the item(s) stored or removed from the data structures in step 426. The record is returned to the migration server 108 and then the record is stored by at least one of the servers. In some embodiments, the record is sent and presented to the first user account via at least one of the client devices 102 and 104, such as shown at step 430. In such embodiments, the record can be sent and presented to the second user account via at least one of the client devices 102 and 104, such as shown at step 432.

Turning to FIG. 5, process 500 details steps performed in accordance with some embodiments of the present disclosure for allowing a first user account share electronic content items with a second user account selectively and seamlessly. The process 500 provides for the content items to be migrated from one or more data structures associated with the first user account to one or more data structures associated with the second user account. Also, the process 500 can include some of the steps illustrated in FIG. 4.

Steps 502, 510, 514, 518 of process 500 are performed by at least a service server of the system (e.g., the service server 106 illustrated in FIGS. 1, 3, and 4). For instance, step 502 can be implemented by at least the first and second data structures 302 and 306. The storing sub-step of step 510 can be implemented by at least the first and second data structures 302 and 306. Step 514 can be implemented by at least the second data structure 306. And, the step 518 can be implemented by at least the first and second data structures 302 and 306.

Steps 504, 506, 508, 510, 512, 514, 516, and 518 are performed by at least a migration server of the system (e.g., the migration server 108 illustrated in FIGS. 1, 3, and 4). For instance, step 504 can be implemented by at least the transactions analysis module 320. Steps 506 and 508 can be implemented by at least the end-user interfacing module 322. The generation of sharing instructions sub-step of step 510 can be implemented by at least the sharing instructions generator module 324. And, at least some of the aspects of steps 512, 514, 516, and 518 can be implemented by at least the migration controller module 328.

Process 500 begins with step 502, which includes hosting and securing one or more first electronic content item (such as content items 304). The first electronic content item(s) are stored in a first data structure (such as first data structure 302) associated with a first user account. Step 502 also includes hosting and securing one or more second electronic content items (such as content items 306). The second electronic content item(s) are stored in a second data structure (such as second data structure 308) associated with a second user account. In some example embodiments, the first user account and the second user account can be associated with the same user or each account can be associated with a different user. Where the accounts are associated with the same user, the first user account can be a primary account of the user, and the second user account can be a secondary user account of the user. The second data structure can also be independent of the first data structure. Alternatively, the second data structure can be at least partially dependent on the first data structure. In such examples, the first data structure can be a master data structure and the second data structure can be a corresponding slave data structure. The first user account and the second user account are email accounts, photo-sharing accounts, creatives-sharing accounts, document-sharing accounts, social networking accounts, business enterprise accounts, calendaring accounts, financial accounts, or some combination thereof, or some other type of accounts that can share information.

Step 504 includes analyzing electronic communications between the first user account and the second user account to determine at step 505 whether the first user account is to be queried to share the first electronic content item(s) with the second data structure. The last-mentioned determination of step 505 can further include determining a number of instances of separate transactions between the first user account and the second user account (such as shown by step 602 illustrated in FIG. 6). The last-mentioned determination of step 505 also can include determining whether the first user account is to be queried to share the first electronic content item(s) with the second user account via migration of items from data structure(s) of the first account to data structure(s) of the second account (such as shown by step 604 illustrated in FIG. 6). In some embodiments, the last-mentioned determination occurs when the determined number of instances of separate communications between the first user account and the second user account exceeds a threshold. If, at step 505, it is determined that the first account is not to be queried, then the process 500 returns to step 504.

Also, in some example embodiments, the analyzing of the electronic transactions includes filtering out spam, phishing, or other types of unwanted communications or other types of transactions received, communicated, or initiated by the first user account and/or the second user account. Also, in some example embodiments, the analyzing of the electronic transactions includes filtering out some of the instances of separate communications or other types of transactions received, communicated, or initiated between the first user account and the second user account according to machine learning. Also, in such example embodiments, the analyzing of the electronic transactions can include determining a connection score between the first user account and the second user account according to machine learning. The input of the machine learning can include samples of the communications or other types of transactions received, communicated, or initiated between the first user account and the second user account.

Step 506 includes, in response to a determination at step 505 that the first user account is to be queried, querying the first user account for permission to share the first electronic content item(s) with the second data structure. The querying of step 506 of the first user account further includes querying the first user account for permission indications as to types of information it will share (such as shown by step 702 illustrated in FIG. 7). The querying the first user account for permission indications as to types of information it will share can include querying the first user account for permission to share emails. Querying the first user account for permission to share images including photographs and illustrations can also be included. Querying the first user account for permission to share documents can also be included. Querying the first user account for permission to share coupons can also be included. Querying the first user account for permission to share travel information can also be included. Querying the first user account for permission to share calendar and scheduling information can also be included.

Step 508 includes, in response to the first user account permitting at 507 sharing of the first electronic content item(s) with the second data structure, querying the second user account for permission to receive the first electronic content item(s) from the first user account. If, at step 507, it is determined that the first account is not permitting sharing, then the process 500 returns to step 504. The querying of step 508 of the second user account further includes querying the second user account for permission indications as to types of information it will receive from the first user account (such as shown by step 802 illustrated in FIG. 8). The querying the second user account for permission indications as to types of information it will receive from the first user account can include querying the second user account for permission to receive emails. Querying the second user account for permission to receive images including photographs and illustrations can also be included. Querying the second user account for permission to receive documents can also be included. Querying the second user account for permission to receive coupons can also be included. Querying the second user account for permission to receive travel information. Querying the second user account for permission to receive calendar and scheduling information can also be included.

Step 510 includes generating corresponding sharing instructions according to the permission indications of the first user account and the second user account, in response to the second user account permitting at step 509 receiving of the first electronic content item(s) at the second data structure. Step 510 also includes storing the generated sharing instructions in at least one of the first data structure, the second data structure, or a third data structure (such as the third data structure 326 of the migration server 108). If, at step 509, it is determined that the second account is not permitting receiving of the first content item(s) at the second data structure, then the process 500 returns to step 504.

Step 512 includes selecting electronic content item(s) from the first electronic content item(s) according to the generated sharing instruction. Step 514 includes storing a copy of the selected electronic content item(s) into the second data structure, so that access by the second user account to the selected electronic content item(s) is as seamless as accessing the second electronic content item(s).

The second content item(s) being stored in the second data structure of the second user account and originated by the second user account.

Steps 516 and 517 include controlling access to the stored copy of the selected electronic content item(s). Step 516 can include querying the first user account for access control parameters (such as shown by step 902 illustrated in FIG. 9) and step 517 can include receiving access control parameters (such as shown by step 904 illustrated in FIG. 9) or not from the first user account. Also, step 516 and 517 can include controlling the access to the stored copy of the selected electronic content item(s) according to the received access control parameters (such as shown by step 906 illustrated in FIG. 9). For example, the controlling the access to the stored copy of the selected electronic content item(s) can include choosing to remove the item(s) from the first data structure and/or the second data structure at step 518. At step 517, the "Y" at the determination block reflects that choice to remove the content item(s) and the "N" reflects that control of access is directing another type of action different from removal of the item(s).

The received access control parameters can include permission for permanent access, by the first and/or second user account, to the stored copy of the selected electronic content item(s). Permission for temporary access, by the first and/or second user account, to the stored copy of the selected electronic content item(s) can also be included. Permission for synchronized updating of the stored copy of the selected electronic content item(s) can also be included. Permission for periodic updating, by the first and/or second user account, of the stored copy of the selected electronic content item(s) can also be included. Permission for manual updating, by the first and/or second user account, of the stored copy of the selected electronic content item(s) can also be included. Read permission, for the first and/or second user account, for the stored copy of the selected electronic content item(s) can also be include. Write permission, for the first and/or second user account, for the stored copy of the selected electronic content item(s) can also be included. Execution permission, for the first and/or second user account, for the stored copy of the selected electronic content item(s) can also be included if a part of the content item(s) are executable. The received access control parameters can also include instructions on revocation of access, by the first and/or second user account, of the stored copy of the selected electronic content item(s). The received access control parameters can also include other instructions on management of access, by the first and/or second user account, of the stored copy of the selected electronic content item(s).

In some embodiments, the access control parameters, the sharing instructions, and metadata corresponding to the content item(s) and other types of metadata are stored in a database associated with one or more of the servers described herein. Also, the access control parameters, the sharing instructions, and metadata corresponding to the content item(s) and other types of metadata can be stored in headers of corresponding digital files of all the content item(s) in some embodiments, or specifically in the selected content items(s) in other embodiments. The database associated with the one or more of the servers is relational database in some embodiments. Also, the database can be or include a distributed database, a document-oriented database, a hybrid transactional/analytical processing (HTAP) database, a key-value database, an object database, a parallel database, an XML database, a graph database, a full text database, or a blockchain based database.

In some embodiments, the determination of the access control parameters is according to output of a content importance analyzer or another type of automated determination. The determination of the access control parameters can be enhanced by machine learning or another form of artificial intelligence. The machine learning can include one or more of decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule-based machine learning, learning classifier systems, or feature selection approach. Also, in some embodiments, the removing of the stored copy of the selected electronic content item(s) at 518 from the second data structure can be according to a security risk evaluator. And, in some embodiments, the removing of the selected electronic content item(s) at 518 from the first data structure can be according to the security risk evaluator. The security risk evaluator can include or be enhanced by machine learning or some other form of artificial intelligence, and determinations of information removal from a data structure can be enhanced by machine learning or some other form of artificial intelligence.

Those skilled in the art will recognize that the disclosed methods and systems can be implemented in many manners and are not limited by the foregoing exemplary embodiments and examples. Functional elements being performed by single or multiple components, in various combinations of hardware and software or firmware, and individual functions, can be distributed at the client, server or cloud level, or at all levels. In this regard, any of the features described herein can be combined into single or multiple embodiments, and alternate embodiments having fewer than, or more than, all of the features described herein are possible.

The embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Functionality can also be, in whole or in part, distributed among multiple components, in manners now known or to become known. Thus, myriad software/hardware/firmware combinations are possible in achieving the functions, features, interfaces and preferences described herein. The scope of the present disclosure covers known manners for carrying out the described unconventional features and functions and interfaces, as well as those variations and modifications that can be made to the hardware or software or firmware components described herein as would be understood by those skilled in the art now and hereafter. Thus, while various embodiments have been described for purposes of this disclosure, such embodiments should not be deemed to limit the teaching of this disclosure to those embodiments. Various changes and modifications can be made to the elements and operations described herein to obtain a result that remains within the scope of the systems and processes described in this disclosure.

What is claimed is:

1. A method, implemented by one or more server computers, for sharing information from one user account to another user account, the method comprising:

hosting first electronic content items stored in a first data structure associated with a first user account;
hosting second electronic content items stored in a second data structure associated with a second user account;
analyzing electronic communications and other types of electronic transactions between the first user account and the second user account to determine whether the first user account is to be queried to share the first electronic content items with the second user account, wherein the analyzing the electronic communications and other types of electronic transactions comprises:
  determining a number of instances of separate electronic communications and other types of electronic transactions between the first user account and the second user account; and
  determining the first user account is to be queried to share the first electronic content items with the second user account when the determined number of instances of separate electronic communications and other types of electronic transactions between the first user account and the second user account exceeds a threshold;
querying the first user account for permission to share the first electronic content items with the second user account, in response to determining that the first user account is to be queried;
querying the second user account for permission for the second user account to receive the first electronic content items from the first user account, in response to the first user account permitting sharing of the first electronic content items with the second user account;
generating sharing instructions according to permission indications of the first user account and the second user account, in response to the second user account permitting receiving, by the second user account, of the first electronic content items, wherein the permission indications result from the queries of the first user account and the second user account;
selecting electronic content items from the first electronic content items according to the generated sharing instruction; and
storing a copy of the selected electronic content items into the second data structure, so that access by the second user account to the selected electronic content items is as seamless as accessing the second electronic content items.

2. The method of claim 1, wherein the querying of the first user account further comprises querying the first user account for types of information it is willing share, which results in the permission indications of the first user account, the querying of the first user account for types of information it is willing to share is selected from the group consisting of:
  querying the first user account for permission to share emails,
  querying the first user account for permission to share images comprising photographs and illustrations,
  querying the first user account for permission to share documents,
  querying the first user account for permission to share coupons,
  querying the first user account for permission to share travel information,
  querying the first user account for permission to share calendar and scheduling information, and
  any combination thereof.

3. The method of claim 1, wherein the querying of the second user account further comprises querying the second user account for types of information it is willing to receive, which results in the permission indications of the second user account, the querying the second user account for types of information it is willing to receive is selected from the group consisting of:
  querying the second user account for permission to receive emails,
  querying the second user account for permission to receive images comprising photographs and illustrations,
  querying the second user account for permission to receive documents,
  querying the second user account for permission to receive coupons,
  querying the second user account for permission to receive travel information,
  querying the second user account for permission to receive calendar and scheduling information, and
  any combination thereof.

4. The method of claim 1, wherein the analyzing the electronic communications and other types of electronic transactions between the first user account and the second user account comprises filtering out spam, phishing, or other types of unwanted communications received by the first user account and the second user account.

5. The method of claim 1, wherein the analyzing the electronic communications and other types of electronic transactions between the first user account and the second user account comprises determining a connection score between the first user account and the second user account according to machine learning, wherein the input of the machine learning comprises samples of the electronic communications and other types of electronic transactions between the first user account and the second user account.

6. The method of claim 1, further comprising:
  querying the first user account for access control parameters;
  receiving access control parameters from the first user account; and
  controlling access to the stored copy of the selected electronic content items according to the received access control parameters.

7. The method of claim 6, wherein the received access control parameters are selected from the group consisting of:
  permission for permanent access to the stored copy of the selected electronic content items,
  permission for temporary access to the stored copy of the selected electronic content items,
  permission for synchronized updating of the stored copy of the selected electronic content items,
  permission for period updating of the stored copy of the selected electronic content items,
  permission for manual updating of the stored copy of the selected electronic content items,
  read permission for the stored copy of the selected electronic content items;
  write permission for the stored copy of the selected electronic content items;
  execution permission for the stored copy of the selected electronic content items if a part of the content is executable,
  instructions on revocation of access of the stored copy of the selected electronic content items,
  other instructions on management of access of the stored copy of the selected electronic content items, and
  any combination thereof.

8. The method of claim 6, wherein the received access control parameters are determined according to output of a content importance analyzer.

9. The method of claim 8, wherein the content importance analyzer uses machine learning to determine access control parameters.

10. The method of claim 6, wherein the access control parameters, the sharing instructions, and metadata corresponding to the first and second electronic content items and other types of metadata are stored in a database.

11. The method of claim 6, wherein the access control parameters, the sharing instructions, and metadata corresponding to the first and second electronic content items and other types of metadata are stored in headers of at least the selected electronic content items.

12. The method of claim 1, further comprising removing the stored copy of the selected electronic content items from the second data structure according to output of a security risk evaluator, wherein the security risk evaluator comprises machine learning and determinations of information removal by the security risk evaluator are enhanced by the machine learning.

13. The method of claim 1, further comprising removing the selected electronic content items from the first data structure according to output of a security risk evaluator, wherein the security risk evaluator comprises machine learning and determinations of information removal by the security risk evaluator are enhanced by the machine learning.

14. The method of claim 1, wherein the first user account is a primary account of a user, and the second user account is a secondary user account of the user.

15. The method of claim 1, wherein the second data structure is independent of the first data structure.

16. The method of claim 1, wherein the second data structure is at least partially dependent on the first data structure.

17. The method of claim 16, wherein the first data structure is a master data structure and the second data structure is a corresponding slave data structure.

18. The method of claim 1, wherein the first user account and the second user account each comprise an account selected from the group consisting of an email account, a photo-sharing account, a creatives-sharing account, a document-sharing account, a social networking account, a business enterprise account, a calendaring account, a financial account, another type of account that shares information, and any combination thereof.

19. A non-transitory computer-readable storage medium tangibly encoded with computer-executable instructions, that when executed by a processor associated with one or more server computers, performs a method for sharing information from one user account to another user account, the method comprising:
    hosting first electronic content items stored in a first data structure associated with a first user account;
    hosting second electronic content items stored in a second data structure associated with a second user account;
    analyzing electronic communications and other types of electronic transactions between the first user account and the second user account to determine whether the first user account is to be queried to share the first electronic content items with the second user account, wherein the analyzing the electronic communications and other types of electronic transactions comprises:
        determining a number of instances of separate electronic communications and other types of electronic transactions between the first user account and the second user account; and
        determining the first user account is to be queried to share the first electronic content items with the second user account when the determined number of instances of separate electronic communications and other types of electronic transactions between the first user account and the second user account exceeds a threshold;
    querying the first user account for permission to share the first electronic content items with the second user account, in response to determining that the first user account is to be queried;
    querying the second user account for permission for the second user account to receive the first electronic content items from the first user account, in response to the first user account permitting sharing of the first electronic content items with the second user account;
    generating sharing instructions according to permission indications of the first user account and the second user account, in response to the second user account permitting receiving, by the second user account, of the first electronic content items, wherein the permission indications result from the queries of the first user account and the second user account;
    selecting electronic content items from the first electronic content items according to the generated sharing instruction; and
    storing a copy of the selected electronic content items into the second data structure, so that access by the second user account to the selected electronic content items is as seamless as accessing the second electronic content items.

20. A system, comprising:
    a first data structure comprising first electronic content items, the first data structure associated with a first user account;
    a second data structure comprising second electronic content items, the second data structure associated with a second user account;
    a transactions analysis module of a migration server configured to analyze electronic communications and other types of electronic transactions between the first user account and the second user account to determine whether the first user account is to be queried to share the first electronic content items with the second user account;
    an end-user interfacing module of the migration server configured to:
        in response to the analysis by the transactions analysis module, query the first user account for permission to share the first electronic content items with the second user account; and
        in response to the first user account permitting sharing of the first electronic content items with the second user account, query the second user account for permission for the second user account to receive the first electronic content items from the first user account;
    a sharing instructions generator module configured to generate corresponding sharing instructions according to permission indications of the first user account and the second user account, the permission indications resulting from the queries of the first user account and the second user account, in response to the second user account permitting receiving, by the second user account, of the first electronic content items from the first user account; and a migration controller module configured to:
   select electronic content items from the first electronic content items according to the generated sharing instruction; and
   direct storage of a copy of the selected electronic content items into the second data structure, so that access by the second user account to the selected electronic content items is as seamless as accessing the second electronic content items in the second data structure.

\* \* \* \* \*